United States Patent
Hayden et al.

(10) Patent No.: US 9,568,655 B2
(45) Date of Patent: Feb. 14, 2017

(54) BACKLIGHT ASSEMBLY

(71) Applicants: Brian John Hayden, Royal Oak, MI (US); Matthew Ritthaler, Trenton, MI (US)

(72) Inventors: Brian John Hayden, Royal Oak, MI (US); Adam Henry Zysnarski; Matthew Ritthaler, Trenton, MI (US)

(73) Assignee: Visteon Global Technologies, Inc., Van Buren Township, MI (US)

( * ) Notice: Subject to any disclaimer, the term of this patent is extended or adjusted under 35 U.S.C. 154(b) by 90 days.

(21) Appl. No.: 14/555,090

(22) Filed: Nov. 26, 2014

(65) Prior Publication Data
US 2015/0185388 A1    Jul. 2, 2015

Related U.S. Application Data (60) Provisional application No. 61/921,021, filed on Dec. 26, 2013.

(51) Int. Cl.
| | |
|---|---|
| *G02B 6/00* | (2006.01) |
| *G01D 11/28* | (2006.01) |
| *F21V 8/00* | (2006.01) |
| *B60K 37/02* | (2006.01) |

(52) U.S. Cl.
CPC .............. *G02B 6/001* (2013.01); *B60K 37/02* (2013.01); *G01D 11/28* (2013.01); *G02B 6/0006* (2013.01)

(58) Field of Classification Search
CPC ......... G01D 11/28; B60Q 3/002; B60Q 3/044; G02B 6/001; G02B 6/0006; B60K 37/02
See application file for complete search history.

(56) References Cited

U.S. PATENT DOCUMENTS

| | | | |
|---|---|---|---|
| 5,695,269 A | 12/1997 | Lippmann et al. | |
| 6,347,882 B1 | 2/2002 | Vrudny et al. | |
| 2002/0135994 A1* | 9/2002 | Ikarashi | G01D 11/28 362/23.2 |
| 2004/0008109 A1* | 1/2004 | Endoh | B60R 16/0232 340/450.2 |
| 2008/0219018 A1 | 9/2008 | Eich | |
| 2012/0087149 A1 | 4/2012 | Weindorf et al. | |

FOREIGN PATENT DOCUMENTS

EP    0 902 260 A2    3/1999

* cited by examiner

*Primary Examiner* — Anh Mai
*Assistant Examiner* — Nathaniel Lee
(74) *Attorney, Agent, or Firm* — Dickinson Wright PLLC (57) ABSTRACT

A backlight assembly for a gauge of an automotive display panel and a method of illuminating a gauge of an automotive display panel is provided. The backlight assembly includes a lightpipe having a U-shaped configuration and a reflective dish surrounding the lightpipe. The lightpipe and the reflective dish are disposed on a mounting plate of the gauge above a liquid crystal display (LCD). Additionally, the backlight assembly includes one or more top firing light emitting diodes (LEDs) disposed adjacent to the lightpipe. The LEDs emit light to the lightpipe which in turn transmits light to the reflective dish. The reflective dish reflects back or disperses the light evenly to illuminate the graphic applique of the gauge.

7 Claims, 7 Drawing Sheets

BACKLIGHT ASSEMBLY

CROSS REFERENCE TO RELATED APPLICATION

This application claims the benefit of Provisional Application Ser. No. 61/921,021 filed on Dec. 26, 2013, and entitled "Backlight Assembly."

BACKGROUND

Light emitting diodes (LEDs) and backlight assemblies are used to illuminate different vehicle components and other electronics. For instance, vehicle gauge displays and entertainment centers are well-known. Typically, these displays are illuminated by one or more lightpipes or lightguides. Such lightpipes or lightguides are custom designed to fit under an entire applique of the display and are designed to distribute light across the display. In particular, one or more lightpipes or lightguides are placed underneath the display to provide illumination. However, such lightpipes or lightguides are costly because injection molding processes are employed to form the lightpipes and lightguides to achieve the required custom shaped and adequate illumination.

To properly illuminate one or more lightpipes, multiple LEDs and in particular side-firing LEDs are used. Typically, a array of side-firing LEDs is placed in the same plane as the lightpipe to flood the lightpipe with light to uniformly illuminate the display. However, such LEDs employ the assistance of outside sources, such as thin flex circuits to ensure operation due to the LEDs constraints. Specifically, such LEDs have low efficacies or ability to produce an adequate amount of light due to the power consumed to operate the LED. As such, the thin flex circuit is provided, placed under the LEDs, and delivers current to operate the LEDs. Unfortunately, the use of thin flex circuit also results in various deficiencies. First, thin flex circuits are costly as the circuits require extensive design implementation and installation to effectively and efficiently operate the LEDs. Second, the LEDs produce heat and create thermal paths, which over time causes the components of the assembly to overheat or create other problems during illumination of the gauge.

SUMMARY

The aspects of the present disclosure provide a backlight assembly of a gauge of an automotive display and a method of illuminating a gauge of an automotive display panel employing backlight assembly.

One aspect of the backlight assembly includes a base, a light crystal display (LCD) affixed to the base, and a mounting plate affixed to the base and disposed over a portion of the LCD. The backlight assembly also includes a lightpipe having a U-shaped configuration, the lightpipe is affixed to the base and the mount plate and a reflective dish having a generally circular shape, the reflective dish is disposed within the mounting plate and surrounds the lightpipe.

Another aspect of the backlight assembly includes U-shaped configuration affixed to a base located within the automotive display panel. The backlight assembly includes a base and a mounting plate affixed to the base. A lightpipe having a U-shaped configuration is affixed to the base and disposed on the mounting plate. The backlight assembly also includes a reflective dish with a generally circular shape and is disposed within the mounting plate and surrounding the lightpipe and a graphic applique disposed over the lightpipe and the reflective dish. The backlight assembly further includes at least one top-firing light emitting diode (LED) disposed adjacent to the lightpipe and being affixed to the base. In operation, the at least one top-firing LED emits light to the lightpipe and the lightpipe transmits the light to the reflective dish, and the reflective dish reflects the light to illuminate the graphic applique.

An aspect of the method of illuminating a gauge of an automotive display panel employing a backlight assembly includes providing a base, affixing a mounting plate to the base and affixing a lightpipe having a generally U-shape configuration to the base such that a portion of the lightpipe is disposed over the mounting plate. The method also includes placing the reflective dish in the mounting plate and surrounding the lightpipe and affixing the at least one LED to the base adjacent to the lightpipe. Light is emitted from the LED to the lightpipe, the light is then transmitted via the lightpipe to the reflective dish and the light is reflected throughout the reflective dish to the graphic applique to illuminate the graphic applique.

The aspects of the present disclosure provide various advantages. For example, the costly injection molding process no longer required in forming the lightpipe for backlight assembly since the backlight assembly uses the reflective dish adjacent to the lightpipe for distributing light evenly to the gauge. Additionally, the use of a top-firing LED has higher efficacies compared to side-firing LEDs and does not require the use of a thin flex circuit to deliver current for the LED to operate. Furthermore, thermal paths are not created within the assembly since the thin flex circuit is no longer used and based on the placement of the LEDs within the gauge.

BRIEF DESCRIPTION OF THE DRAWINGS

Other advantages and aspects of the present disclosure will be readily appreciated, as the same becomes better understood by reference to the following detailed description when considered in connection with the accompanying drawings wherein.

DETAILED DESCRIPTION OF THE DISCLOSURE

Detailed examples of the present disclosure are provided herein; however, it is to be understood that the disclosed examples are merely exemplary and may be embodied in various and alternative forms. It is not intended that these examples illustrate and describe all possible forms of the disclosure. Rather, the words used in the specification are words of description rather than limitation, and it is understood that various changes may be made without departing from the spirit and scope of the disclosure. As those of ordinary skill in the art will understand, various features of the present disclosure as illustrated and described with reference to any of the figures may be combined with features illustrated in one or more other figures to produce examples of the present disclosure that are not explicitly illustrated or described. The combinations of features illustrated provide representative examples for typical applications. However, various combinations and modifications of the features consistent with the teachings of the present disclosure may be desired for particular applications or implementations.

The aspects disclosed herein provide a backlight assembly of a gauge of an automotive display panel and a method for illuminating a gauge of an automotive display panel employing a backlight assembly. One aspect of the backlight assembly includes a lightpipe having a U-shaped configuration and a reflective dish surrounding the lightpipe. The lightpipe and the reflective dish are disposed on a mounting plate of the gauge above a liquid crystal display (LCD). Additionally, another aspect of the backlight assembly includes one or more top firing light emitting diodes (LEDs) disposed adjacent to the lightpipe. The LEDs emit light to the lightpipe, which in turn transmits light to the reflective dish. The reflective dish reflects back or disperses the light evenly to illuminate the graphic applique of the gauge.

Figure 1A:
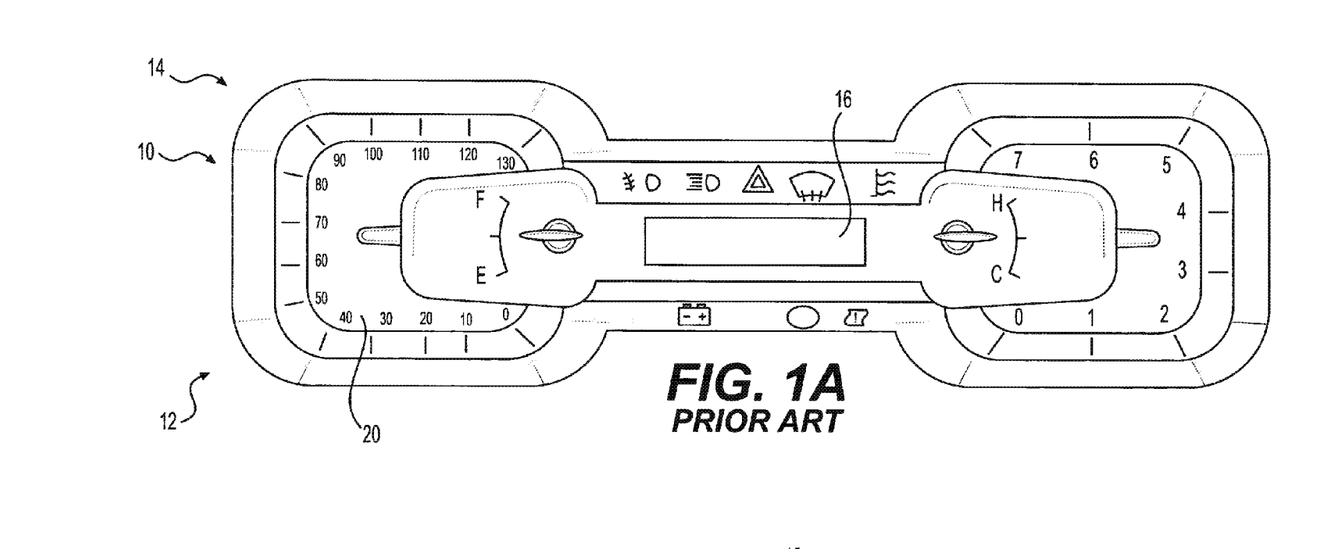
FIGS. 1(A) and 1(B) are examples of illustrations of a backlight assembly for automotive display panels.
Figure 1B:
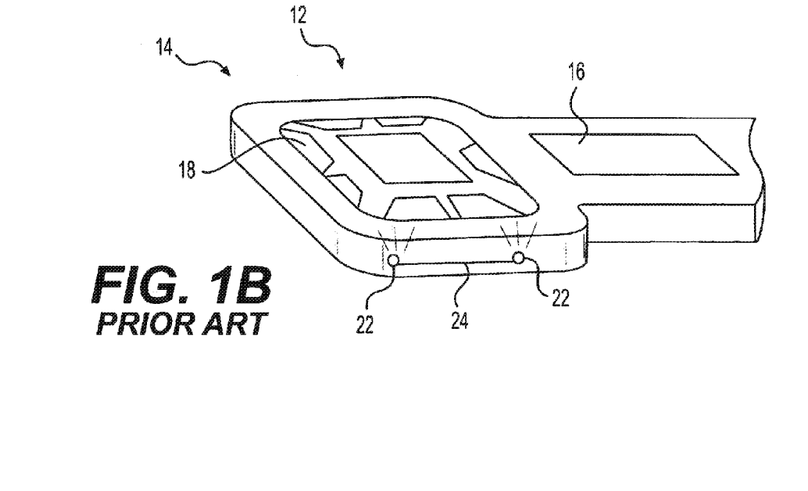

FIGS. 1(A) and 1(B) are examples of illustrations of prior art of automotive display panel 10 with a backlight assembly 12. In particular, FIG. 1(A) is a front view of an automotive panel display 10. The automotive display panel 10 includes a gauge 14 which displays vehicle information such as speed or revolutions per minute and a liquid crystal display (LCD) 16 disposed next to the gauge 14. Lightpipes 18 are disposed within (not shown) or around the gauge 14. An applique 20 is also be disposed on the gauge 14. FIG. 1B is a perspective view of the automotive display panel 10 with a backlight assembly 12. Specifically, FIG. 1(B) shows the lightpipe 18 adjacent to the LCD 16. Additionally, a light emitting diode (LED) 22 is shown to emit light to the lightpipe 18 and a thin flex circuit is shown at 24 to deliver current to the LED 22.

Figure 2:
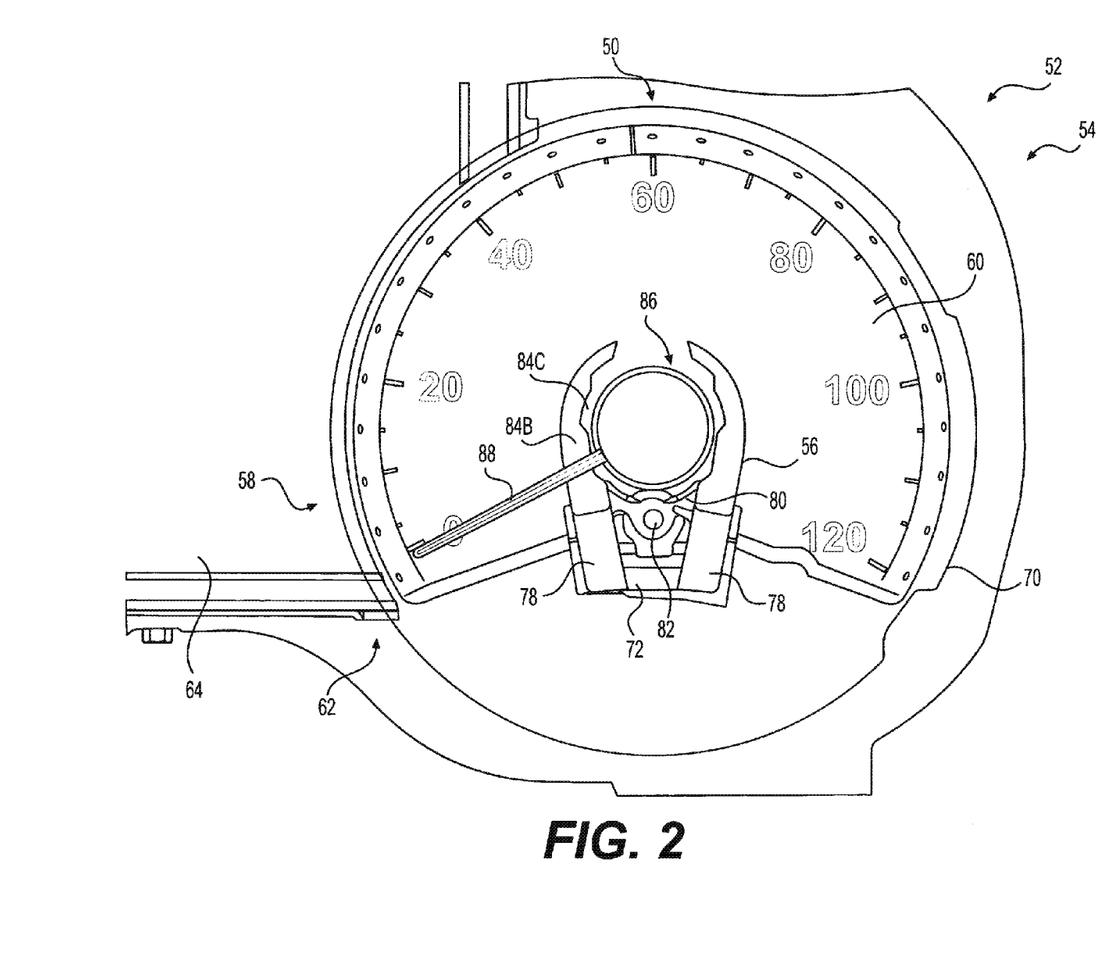
FIG. 2 is an example of a top view of an automotive display panel and a gauge employing a backlight assembly in accordance with the present disclosure.

FIG. 2 is an example of an illustration of a gauge 50 of an automotive display panel 52 employing a backlight assembly 54 in accordance with the present disclosure. Specifically, FIG. 2 shows the gauge 50 in the form of a speedometer having indicia, such as tick marks and numbers denoting speed. In one aspect, the backlight assembly 54 employs a lightpipe 56 and a reflective dish 58, and surrounds the lightpipe 56 to illuminate a graphic applique 60 of the gauge 50. The lightpipe 56 and reflective dish 58 are disposed above a portion of an LCD 64. In another example, the backlight assembly 54 employs one or more top-firing LEDs to illuminate the lightpipe 56. The backlight assembly 54 is described in more detail below.

The backlight assembly 54 of FIG. 2 includes a base for supporting the gauge 50 of the automotive display panel 52. A LCD 64 is also supported by and affixed to the base. A mounting plate 70 is further disposed on the base 66 and over a portion 62 of the LCD 64. The mounting plate 70 is designed to hold the components which form the gauge 50.

The backlight assembly 54 also includes the lightpipe 56 having a U-shaped configuration. The lightpipe 56 has a base portion 72. The base portion 72 has a first end 74 and a second end 76 with a pair of arms 78 extending upwardly therefrom. A bridge 80 extends between the pair of arms 78 and is affixed to the mounting plate 70 via a pin 82. The bridge 80 is designed to secure the lightpipe 56 to the mounting plate 70 and to maintain the shape of the lightpipe 56. The pair of arms 78 of the lightpipe 56 has one or more curvatures 84 in one or more directions such as a first or initial curvature in a first direction and a second curvature 84B in a second direction. The second curvature 84B is generally perpendicular to the first curvature 84A. A third curvature 84C in a third direction is also provided. Specifically, the third curvature 84C is a flat portion which reflects light radially, similar to a mirror. Additionally, the pair of arms 78 form a cavity 86 for receiving a pointer 88. The lightpipe 56 may be made of a translucent polymeric material such as a plastic or optical material. Translucent polymeric material may be clear or can be cloudy. The lightpipe 56 is configured to allow light to propagate from the base portion 72 of the lightpipe 56 to each of the one or more curvatures 84. It is appreciated by one skilled in the art that more than three curvatures may exist within the lightpipe 56. Additionally, the curvatures 84 may act as a mirror type next and internally reflect light to transmit effectively.

A reflective dish 58 is also shown. The reflective dish 58 has a circular shape and is disposed within the mounting plate 70. The reflective dish 58 surrounds the lightpipe 56 such that the reflective dish 58 is adjacent to the lightpipe 56. The reflective dish 58 may be made of a reflective polymeric material, such as, plastic or an optical material such reflective polymeric material is a white polymeric material. The reflective dish 58 is configured to receive light from the lightpipe 56 and spread or distribute light evenly.

A graphic applique 60 is disposed over the lightpipe 56 and the reflective dish 58 and is affixed to the mounting plate 70. As shown in FIG. 2, the graphic applique 60 is a speedometer as discussed above and includes indicia, such as tick marks and numbers to denote speed. The indicia may be designed to illuminate or enables light through to allow the user to see or read such text, even at night. Further, a pointer 88 is disposed in the cavity 86 of the lightpipe 56 and over the graphic applique 60. The pointer 88 is configured to rotate freely.

In operation, the backlight assembly 54 and in particular, the lightpipe 56 and the reflective dish 58 are configured to illuminate the graphic applique 60 of the gauge 50.

Figure 3:
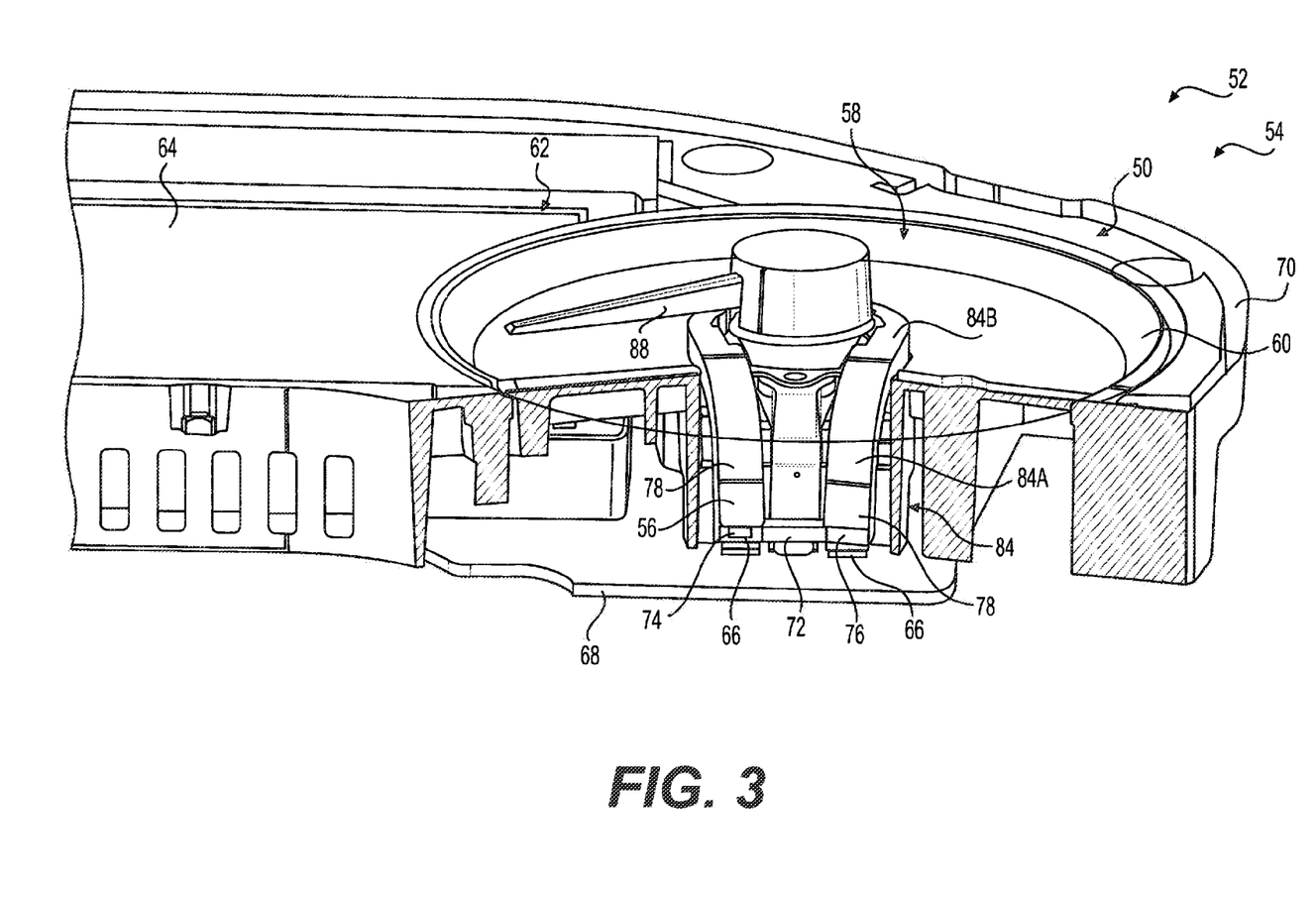
FIG. 3 is an example of a perspective view of an automotive display panel having a gauge employing a backlight assembly in accordance with the present disclosure.

FIG. 3 is an example of a side view of a gauge 50 of an automotive display panel employing a backlight assembly 54 in accordance with the present disclosure. Referring to FIG. 3, the backlight assembly 54 includes a base, an LCD 64 affixed to the base 68, and a mounting plate 70 affixed to the base 68 and disposed above or on a portion 62 of the LCD 64. Additionally, the backlight assembly 54 includes a lightpipe 56 having a U-shaped configuration. The lightpipe 56 has a base portion 72 with a first end 74 and a second end 76. The base portion 72 of the lightpipe 56 is affixed to the base 68 of the backlight assembly 54. A pair of arms 78 extend upwardly from the base portion 72 of the lightpipe 56 forming the U-shape. The pair of arms 78 have one or more curvatures 84 in one or more directions and engage the mounting plate 70. The pair of arms 78 include a first curvature 84A in a first direction and a second curvature 84B in a second direction. The first direction is in an axial direction and the second direction is in a radial direction. Furthermore, the pair of arms 78 form a cavity 86 which surround the pointer 88 of the gauge 50. Additionally, the lightpipe 56 is affixed to the mounting plate 70 via a bridge 80 connecting the pair of arms 78.

A reflective dish 58 is disposed adjacent to the lightpipe 56 within the mounting plate 70 and a graphic applique 60 is disposed over the reflective dish 58 and lightpipe 56. The backlight assembly 54 further includes one or more top-firing LEDs 66. The LEDs 66 are disposed on the base 68 of the backlight assembly 54 and under or adjacent to the lightpipe 56. In operation, the LEDs 66 emit light to the lightpipe 56, the light is transmitted through the lightpipe 56 to the reflective dish 58 which reflects the light evenly to the graphic applique 60.

Figure 4:
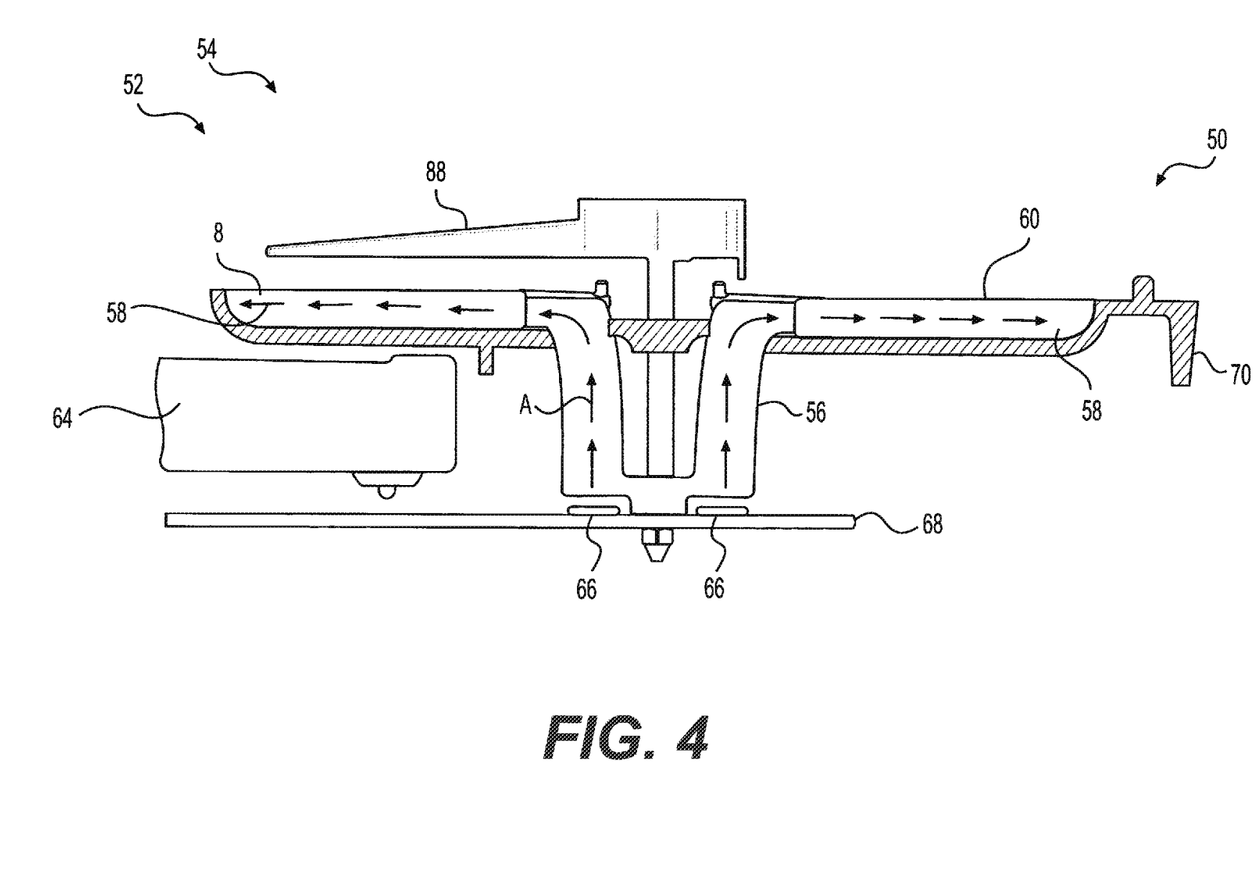
FIG. 4 is an example of a cross-sectional view of an automotive display panel having a gauge employing a backlight assembly in accordance with the present disclosure.

FIG. 4 is an example of a cross-sectional view of a backlight assembly 54 for a gauge 50 of an automotive display panel 52 in accordance with the present disclosure. Referring to FIG. 4, the backlight assembly 54 includes a lightpipe 56 having a U-shaped configuration and a reflective dish 58 surrounding the lightpipe 56. Another aspect of the backlight assembly 54 includes one or more top-firing LEDs 66 disposed adjacent to the lightpipe 56. In operation, light is emitted from the LEDs 66 to the lightpipe 56, the lightpipe 56 then transmits light to the reflective dish which reflects or spreads the light to illuminate a graphic applique 60.

The backlight assembly 54 includes a base 68. The base 68 acts as a support for the backlight assembly 54 and the gauge 50. The base 68 is located within the automotive display panel 52, is a printed wire board, and is configured to have electronic components mounted thereon. Such electronic components are further described below.

The backlight assembly 54 further includes a lightpipe 56. The lightpipe 56 has a generally U-shape configuration. Specifically, the face of the gauge 50 of the automotive display panel 52. The lightpipe 56 may be configured to refract, transmit, and distribute light throughout the gauge 50 denoted by arrows A. Alternatively, the lightpipe 56 may have a shape conducive to fitting over a liquid crystal display or within the gauge 50 may have a T-shape, cylindrical shape, frustoconical shape, or a generally lateral shape.

The backlight assembly 54 also includes one or more top-firing light emitting diodes (LEDs) 66. The LED 66 are affixed to the base 68 of the backlight assembly 54. Additionally, the LED 66 are adjacent to the lightpipe 56 for the purpose of emitting light to the lightpipe 56. There may be two top-firing LEDs 66 as shown in FIG. 4. The two top-firing LEDs 66 may be the same color or may be different colors. For example, the first LED may be blue and the second LED may be red or both of the LEDs 66 may be clear/white.

The lightpipe 56 is affixed to the mounting plate 70 and the mounting plate 70 is further affixed to the base 68 of the backlight assembly 54. A reflective dish 58 is disposed on the mounting plate 70. The reflective dish 58 has a generally circular shape and is surrounded the lightpipe 56. The reflective dish 58 can have any shape conducive to fit underneath the gauge 50 and around the lightpipe 56. The reflective dish 58 may be made of a reflective polymeric material, such as, a translucent optical material, reflective material, or plastic. The reflective dish 58 is configured to receive light from the lightpipe 56 and disperse or reflect the light evenly throughout the gauge 50 denoted by arrows B.

The backlight display further includes a graphic applique 60. The graphic applique 60 has a similar shape as the reflective dish 58. The graphic applique 60 is disposed on the front of the automotive display panel 52. The graphic applique 60 may be the face of the gauge 50 within the automotive display panel 52 or the portion of the automotive display panel 52 in which the user of the vehicle views. The graphic applique 60 is disposed on the lightpipe 56 and the reflective dish 58. The lightpipe 56 and the reflective dish 58 provide light to graphic applique 60 to illuminate various text or symbols disposed thereon. For example, the graphic applique 60 may be a speedometer and may display various speeds the user may reach while driving. Alternatively, the graphic applique 60 may display various revolutions per minute (RPMs) in which the user may reach while driving. A pointer 88, as shown in FIG. 4, indicates the speed of the vehicle displayed on the graphic applique 60.

FIG. 4 further includes a liquid crystal display (LCD) 64 within the automotive display panel 52. The LCD 64 is disposed between the base 68 and the mounting plate 70 of the backlight assembly 54. The LCD 64 may be disposed on the base 68 of the backlight assembly 54 and underneath the lightpipe 56 and the reflective dish 58 unlike, the prior art where the LCD 64 is typically located above or on top of a lightpipe 56 of a backlight assembly 54.

Figure 5:
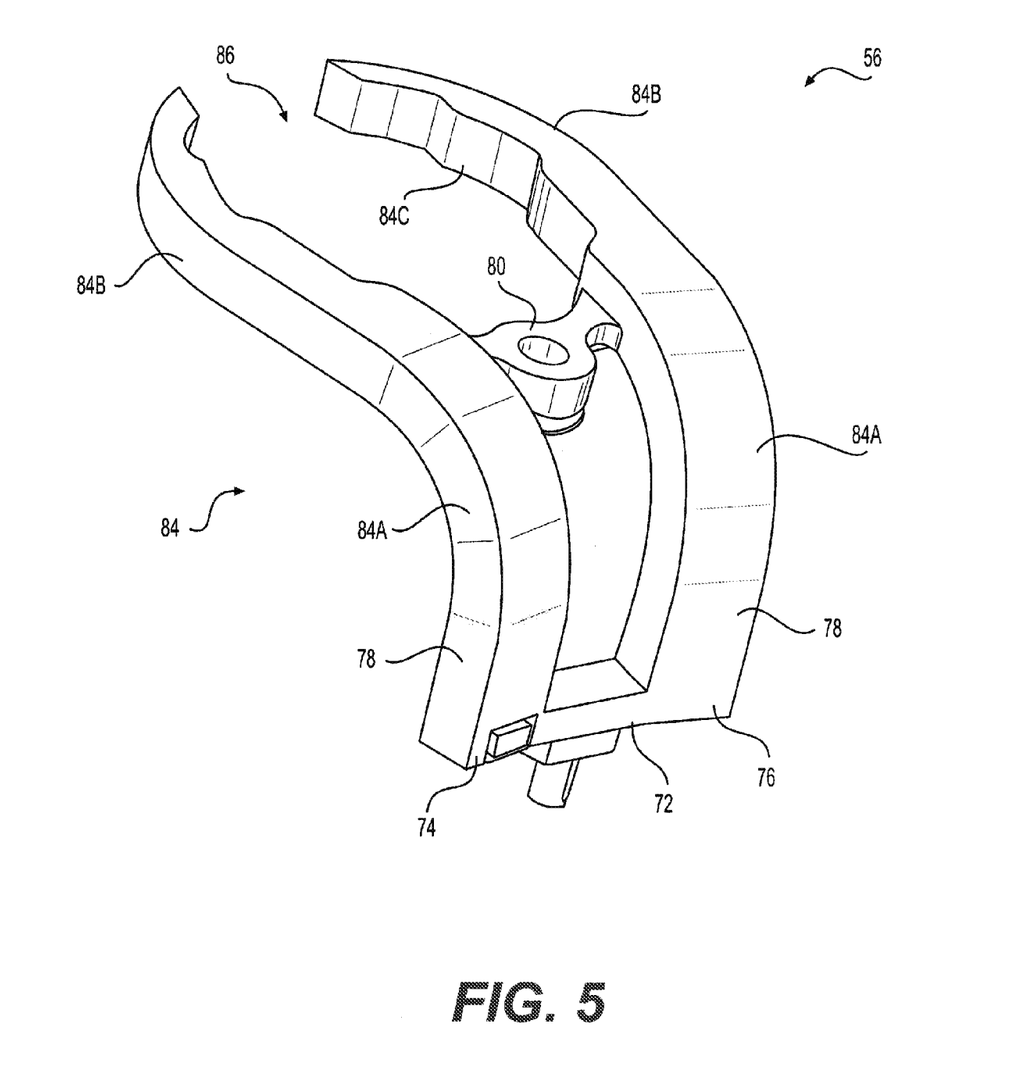
FIG. 5 is an example of a perspective view of a lightpipe of a backlight assembly in accordance with the present disclosure.

FIG. 5 is an example of a perspective view of a lightpipe 56 of a backlight assembly 54 in accordance with the present disclosure. Referring to FIG. 5, the lightpipe 56 has a base portion 72 with a first end 74 and a second end 76. The base portion of the lightpipe 56 is affixed to the base 68 of the backlight assembly 54 and may be adjacent to the LED. The lightpipe 56 may further include a pair of arms 78 extending upwardly from the first end 74 and the second end 76, which may form a generally U-shape configuration. Additionally, the pair of arms 78 may have one or more curvatures 84 in one or more directions. For instance, an initial or first curvature 84A is shown in a first direction and a second curvature 84B is shown in a second direction. The second curvature 84B may be perpendicular to the first curvature 84A. More specifically, the first curvature 84A is shown in an axial direction and the second curvature 84B is shown in a radial direction. Additionally, a third curvature 84C is provided in a third direction. The third curvature 84C is a flat surface, similar to a mirror, which reflects light radially. One or more curvatures 84 are provided to propagate light throughout the lightpipe 56. More than three curvatures may exist within the lightpipe 56. Additionally, the curvatures 84 may act as a mirror type next and internally reflect light to transmit effectively. Furthermore, the second curvature 84B of the pair of arms 78 is configured to form a cavity 86 for holding the pointer 88 of the gauge 50. In other words, the pointer 88 of the gauge 50 is disposed in the cavity 86 and is surrounded by the pair of arms 78 of the lightpipe 56. The lightpipe 56 also has a bridge 80 that extends between the pair of arms 78. The bridge 80 is configured to receive a pin 82 to secure the lightpipe 56 to the gauge 50.

The lightpipe 56 is made of translucent polymeric material such as, but not limited to, plastic and an optical material. Moreover, the lightpipe 56 may be configured to refract or transmit light provided by the LED through the base and the pair of arms 78 to the reflective dish 58. The reflective dish 58 will be described in greater detail below.

Figure 6:
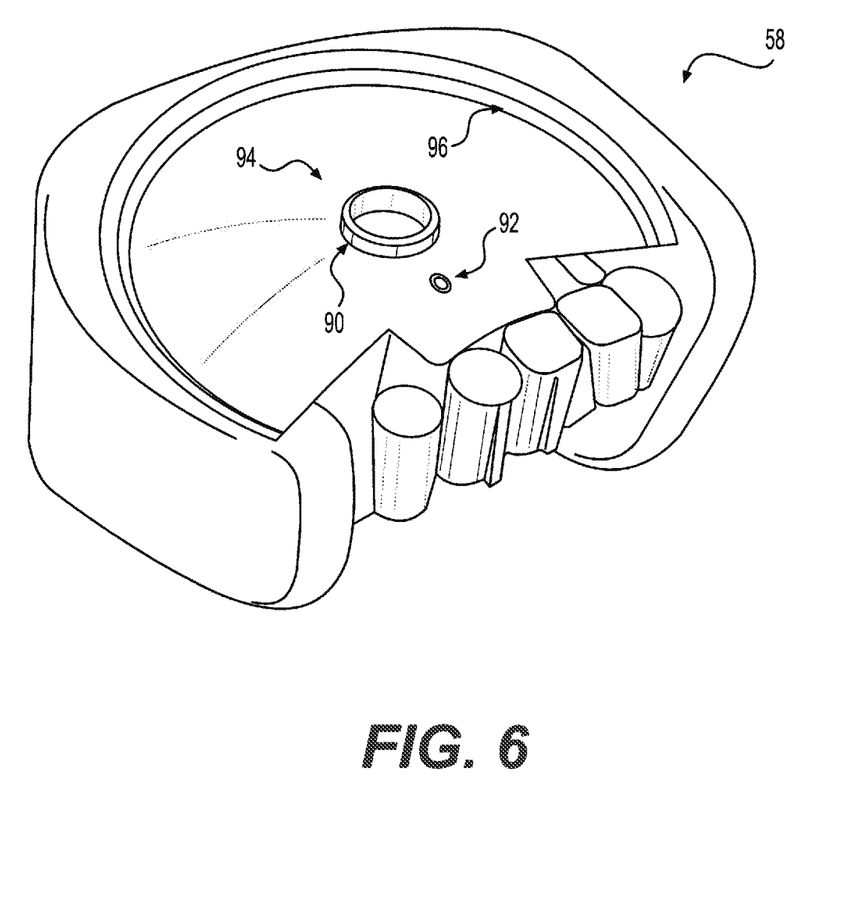
FIG. 6 is an example of a top view of a reflective dish of a backlight assembly in accordance with the present disclosure.

FIG. 6 is an example of a top view of a reflective dish 58 of a backlight assembly 54 in accordance with the present disclosure. The reflective dish 58 has a generally circular shape configuration which has a center portion 94 and a peripheral portion 96. However, one skilled in the art appreciates that reflective dish 58 may have any shape. The center portion 94 of the reflective dish 58 includes a first cavity 90 and a second cavity 92. Similar to the lightpipe 56, the pointer 88 of the gauge 50 and the pair of arms 78 of the lightpipe 56 is disposed in the first cavity 90 and the second cavity 92 receives a pin 82 to secure the lightpipe 56 and reflective dish 58 to the mounting plate 70. The peripheral portion 96 of the reflective dish 58 has a flange 98 or a rim. The peripheral portion 96 is configured to be illuminated to light the area surrounding the gauge 50. The reflective dish 58 surrounds the lightpipe 56 or may be adjacent to the lightpipe 56. The lightpipe 56 provides light to the reflective dish 58 through one or more curvatures 84. The reflective dish 58 is configured to receive light from the lightpipe 56, and reflect, distribute, or disperse the light evenly throughout the reflective dish 58 to illuminate the graphic applique 60 disposed on the reflective dish 58 discussed above in FIG. 3. Additionally, like the lightpipe 56, the reflective dish 58 is made of a translucent polymeric material, such as, optical material, reflective material, or plastic.

Figure 7:
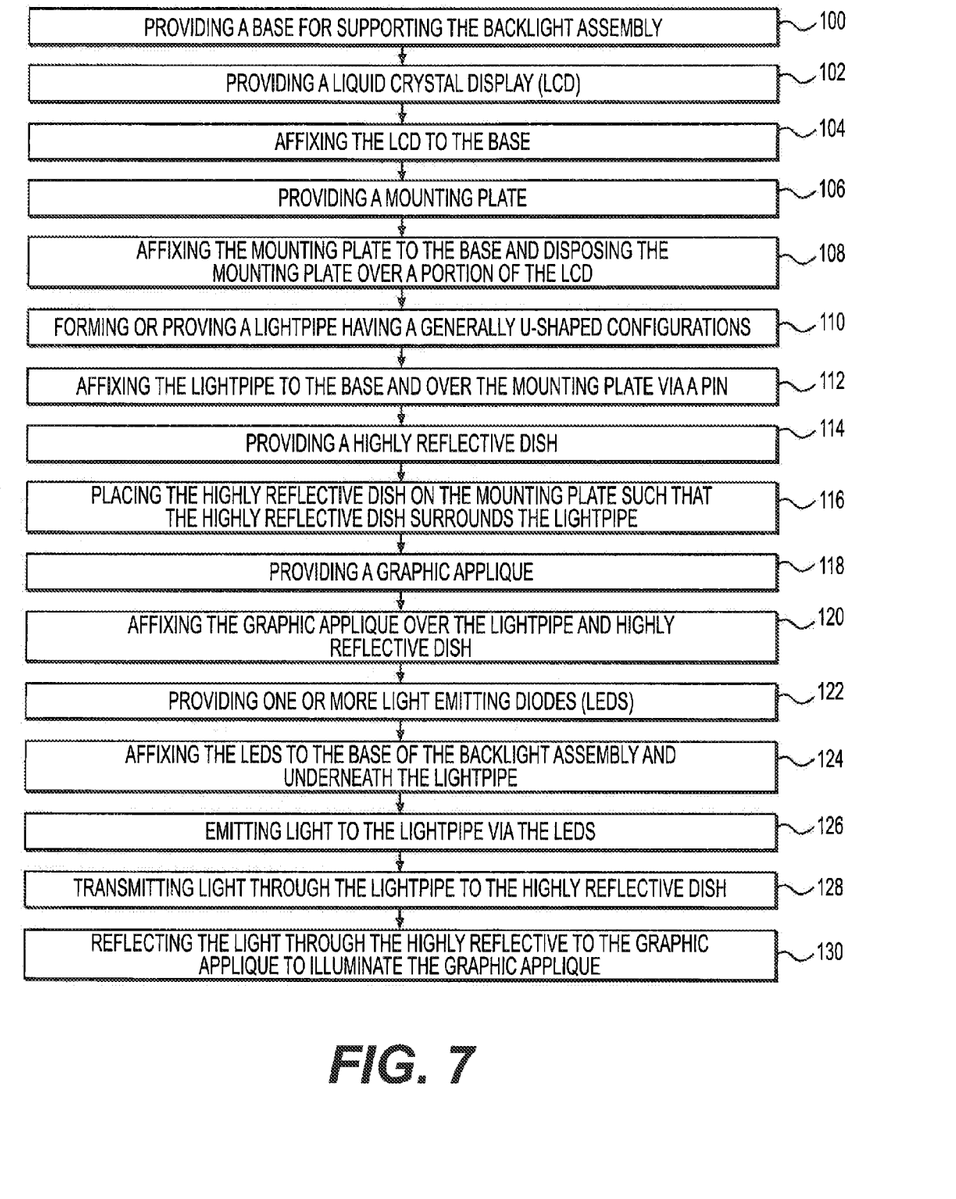
FIG. 7 is an example of a flowchart of a method of illuminating a gauge of an automotive display panel using a backlight assembly in accordance with the present disclosure.

FIG. 7 is an example of a flowchart of a method for illuminating a gauge of an automotive display panel employing a backlight assembly in accordance with the present disclosure. The method includes providing a base for supporting the backlight assembly 100, providing a liquid crystal display (LCD) 102, and affixing the LCD to the base 104. A mounting plate is also provided 106 and the mounting plate is affixed to the base and is disposed over a portion of the LCD 108.

The method also includes forming or providing the lightpipe having a U-shaped configuration with a pair of arms having one or more curvatures in one or more directions 110. The pair of arms with a first curvature extending in the axial direction and second curvature extending in the radial direction. The pair of arms also include a third curvature in a third direction such as a flat portion in the radial direction and reflects light radially, similar to a mirror. The pair of arms form a cavity for receiving a pointer of the gauge. The lightpipe is then affixed to the base and over the mounting plate via a pin 112. A reflective dish with a generally circular shape is also provided 114 and is disposed or placed on the mounting plate as well as surrounds the lightpipe specifically the pair of arms forming the cavity 116.

The method further includes providing a graphic applique 118 and affixing the graphic applique over the lightpipe and reflective dish to the mounting plate 120. One or more light emitting diodes (LEDs) is also provided 122 and is affixed to the base adjacent to the lightpipe 124. Light from the LEDs is emitted to the lightpipe 126. The light is then transmitted through the lightpipe through the pair of arms and one or more curvatures to the reflective dish 128. The reflective dish reflects the light there through to the graphic applique and illuminates the graphic applique 130.

As described above, FIGS. 2 to 7 illustrate the backlight assembly 54 specifically in regards to an automotive display panel 52; however, the backlight assembly 54 is not limited to the automotive display panel 52. A backlight assembly 54 having a top-firing LED located below a lightpipe 56 and reflective dish 58 above an LCD 64 has application in household appliances as well as recreational vehicles, recreational appliances, or children's toys. Additionally, the use of a top-firing LED located below a lightpipe and reflective dish above an LCD may have application outside of an automotive vehicle, for instance, a smart device may employ illuminated push buttons. Moreover, the use of a top-firing LED below a lightpipe 56 and a reflective dish 58 above an LCD 64 above an LCD 64 may have application with an automotive vehicle other than within the automotive display panel 52 such as, but not limited to, knob assemblies or push buttons surrounding vehicle displays.

What is claimed is:

1. A backlight assembly for a gauge of an automotive display panel, comprising:
   a base;
   a mounting plate affixed to the base;
   a lightpipe with a U-shaped configuration, the lightpipe being affixed to the base and disposed on the mounting plate;
   a reflective dish with a circular shape, the reflective dish being disposed within the mounting plate and surrounding the lightpipe
   a graphic applique disposed over the lightpipe and the reflective dish; and
   a top-firing light emitting diode (LED) disposed adjacent to the lightpipe and being affixed to the base,
   wherein the top-firing LED emits light to the lightpipe and the lightpipe transmits the light to the reflective dish, and wherein the reflective dish reflects the light to illuminate the graphic applique, and
   the lightpipe is affixed to the base of the backlight assembly via a base portion and a pair of arms extend upwardly from the base portion and engage the mounting plate, and wherein light is transmitted through the pair of arms to reflective dish.

2. The backlight assembly of claim 1, further comprising a liquid crystal display (LCD) affixed to the base.

3. The backlight assembly of claim 2, wherein the mounting plate is disposed over a portion of the LCD.

4. The backlight assembly of claim 1, wherein the top-firing LED is two top-firing LEDs.

5. A method for illuminating a gauge of an automotive display panel employing a backlight assembly, comprising:
   providing a base;
   affixing a mounting plate to the base;
   affixing a lightpipe with a U-shaped configuration to the base, wherein a portion of the lightpipe is disposed over the mounting plate;
   placing the reflective dish in the mounting plate and surrounding the lightpipe;
   affixing a light emitting diode (LED) to the base adjacent to the lightpipe;
   emitting light from the LED to the lightpipe;
   transmitting light via the lightpipe to the reflective dish;
   reflecting light throughout the reflective dish to a graphic applique to illuminate the graphic applique, and
   forming the lightpipe, wherein the lightpipe has a base portion configured to engage the base of the backlight assembly and has a pair of arms extending upwardly from the base, and wherein the pair of arms have a first curvature.

6. The method of claim 5, further comprising:
   providing a liquid crystal display (LCD), and
   affixing the LCD to the base,
   wherein the mount plate is disposed over a portion of the LCD.

7. The method of claim 5, further comprising:
   affixing a graphic applique to the mounting plate over the lightpipe and reflective dish.

* * * * *